United States Patent
Royyuru (10) Patent No.: US 9,842,323 B2
(45) Date of Patent: Dec. 12, 2017

(54) SYSTEMS AND METHODS FOR COMMUNICATING TRANSACTION-RELATED DATA TO A RECIPIENT DEVICE

(71) Applicant: First Data Corporation, Greenwood Village, CO (US)

(72) Inventor: Vijay Kumar Royyuru, Norristown, PA (US)

(73) Assignee: First Data Corporation, Greenwood Village, CO (US)

( * ) Notice: Subject to any disclaimer, the term of this patent is extended or adjusted under 35 U.S.C. 154(b) by 30 days.

(21) Appl. No.: 13/801,909

(22) Filed: Mar. 13, 2013

(65) Prior Publication Data

US 2013/0254108 A1    Sep. 26, 2013

Related U.S. Application Data

(60) Provisional application No. 61/613,246, filed on Mar. 20, 2012.

(51) Int. Cl.
| | |
|---|---|
| *G06Q 30/00* | (2012.01) |
| *G06Q 20/04* | (2012.01) |
| *G06Q 30/02* | (2012.01) |
| *G06Q 20/36* | (2012.01) |

(52) U.S. Cl.
CPC ............. *G06Q 20/04* (2013.01); *G06Q 20/36* (2013.01); *G06Q 30/0207* (2013.01)

(58) Field of Classification Search
None
See application file for complete search history.

(56) References Cited

U.S. PATENT DOCUMENTS

| | | | |
|---|---|---|---|
| 2002/0120598 A1* | 8/2002 | Shadmon | G06F 17/30911 |
| 2007/0162389 A1* | 7/2007 | Hamilton | G06Q 20/1085 705/43 |
| 2008/0167961 A1* | 7/2008 | Wentker | G06Q 20/10 705/14.25 |
| 2009/0159673 A1* | 6/2009 | Mullen et al. | 235/380 |

(Continued)

FOREIGN PATENT DOCUMENTS

GB    WO 2008071924 A2 *    6/2008    ........... G06K 7/0008

OTHER PUBLICATIONS

BEAWebLogic Server™ and WebLogic Express® Programming WebLogic JSP Tag Extensions Release 8.1 Document Revised: Jun. 28, 2002.*

*Primary Examiner* — William Rankins
(74) *Attorney, Agent, or Firm* — Eversheds Sutherland (US) LLP (57) ABSTRACT

Embodiments of the disclosure relate to systems and methods for communicating transaction-related data to a recipient device. In at least one embodiment, a computer-implemented method can be provided. The method can include directing storage of transaction-related information comprising payment data and value added services data. The method can further include communicating the transaction-related information to a recipient device during a card emulation communication initiated by the recipient device, wherein the recipient device utilizes the transaction-related information to complete a payment transaction and provide one or more value added services associated with the payment transaction.

18 Claims, 4 Drawing Sheets

(56) References Cited

U.S. PATENT DOCUMENTS

| | | | |
|---|---|---|---|
| 2011/0208820 A1* | 8/2011 | Bittles | G06F 9/541 709/206 |
| 2012/0094603 A1* | 4/2012 | Hoeksel et al. | 455/41.2 |
| 2013/0046643 A1* | 2/2013 | Wall | G06Q 30/06 705/16 |

* cited by examiner

SYSTEMS AND METHODS FOR COMMUNICATING TRANSACTION-RELATED DATA TO A RECIPIENT DEVICE

RELATED APPLICATION

This application claims priority to U.S. Provisional Patent Application No. 61/613,246, entitled "Systems and Methods for Communicating Transaction-Related Data to a Recipient Device," filed on Mar. 20, 2012, the contents of which are incorporated by reference herein in their entirety.

TECHNICAL FIELD

Embodiments of the disclosure relate generally to payment transactions, and more specifically to the use of a card emulation mode to facilitate communication of transaction-related data to a recipient device.

BACKGROUND

Payment transactions typically involve the provision of transaction information from a consumer or payer device to a payee device. For example, a purchase transaction at a point of sale ("POS") typically involves the provision of payment information from a consumer payment device to a merchant terminal. Increasingly, mobile devices and other contactless payment devices are being employed in conjunction with payment transactions. Typically, a contactless payment device includes near field communication ("NFC") functionality that facilitates the communication of data from the payment device to a recipient NFC reader device. These contactless devices typically use existing International Standards Organization ("ISO") standards, such as ISO 14443 and ISO 18092, to provide information to a reader device during a card emulation mode. In other words, the contactless payment devices typically operate as passive devices that are invoked and read by a reader.

During a typical transaction, a contactless reader will activate a contactless payment device when it is within range. The reader will then collect data from the contactless payment device and format it into Track 1 and Track 2 data elements having the same form and structure as Track 1 and Track 2 data elements read from a magnetic stripe card. Any additional data received from the contactless payment device typically requires the invocation of one or more additional applications employed by the contactless payment device. Accordingly, there is an opportunity for improved systems and methods for communicating additional other transaction-related data to a reader device via a card emulation mode.

BRIEF DESCRIPTION OF THE DISCLOSURE

Certain embodiments of the disclosure can address some or all of the above needs. Certain embodiments of the disclosure can provide systems and methods for communicating transaction-related data to a recipient device. In certain instances, use of a card emulation mode can facilitate communication of transaction-related data to a recipient device. In one embodiment, one or more computer-readable media can be provided. The one or more computer-readable media can be configured to store computer-executable instructions. When executed by one or more processors, the computer-executable instructions can configure the one or more processors to direct storage of transaction-related information comprising payment data and value added services data. In addition, the computer-executable instructions can configure the one or more processors to communicate the transaction-related information to a recipient device during a card emulation communication initiated by the recipient device, wherein the recipient device utilizes the transaction-related information to complete a payment transaction and provide one or more value added services associated with the payment transaction.

In one aspect of an embodiment, the value added services data can include at least one of (i) data associated with one or more value added services to be performed before completion of the payment transaction or (ii) data associated with one or more value added services to be performed following completion of the payment transaction.

In one aspect of an embodiment, the card emulation communication is initiated by the recipient device in association with a card emulation protocol.

In one aspect of an embodiment, the card emulation protocol can include one of an International Standards Organization 14443 protocol or an International Standards Organization 18092 emulation protocol.

In one aspect of an embodiment, the value added services data can include a plurality of nested tags and associated values.

In one aspect of an embodiment, the value added services can include at least one of: electronic wallet services, loyalty services, coupon redemption services, location-based mobile services, electronic receipt services, product registration services, product warranty services, coupon and/or offer issuance services, targeted advertisement services, or receipt reconciliation with issuer statement services.

In one aspect of an embodiment, the recipient device can include at least one of the following: a merchant POS terminal, a merchant register, a merchant computer, a mobile device, a laptop computer, a tablet computer, a mobile phone, or a smart phone.

In another embodiment, a merchant point of sale device can be provided. The merchant point of sale device can include at least one reader device configured to read transaction-related information from a payment device via a card emulation mode of operation. In addition, the merchant point of sale device can include at least one processor configured to (i) receive transaction-related information, (ii) extract, from the received information, payment data and value added services data associated with one or more value added services, (iii) process a payment utilizing the payment data, and (iv) facilitate at least one value added service utilizing the value added services data.

In one aspect of an embodiment, the card emulation mode is facilitated via one of an International Standards Organization 14443 protocol or an International Standards Organization 18092 emulation protocol.

In one aspect of an embodiment, the value added services data can include a plurality of nested tags and associated values.

In one aspect of an embodiment, the value added services can include at least one of: electronic wallet services, loyalty services, coupon redemption services, location-based mobile services, electronic receipt services, product registration services, product warranty services, coupon and/or offer issuance services, targeted advertisement services, or receipt reconciliation with issuer statement services.

In one aspect of an embodiment, the payment device can include at least one of the following: a mobile device, a mobile phone, a smart phone, a laptop computer, or a tablet computer.

In yet another embodiment, a computer-implemented method can be provided. The method can include directing storage of transaction-related information comprising payment data and value added services data. The method can further include communicating the transaction-related information to a recipient device during a card emulation communication initiated by the recipient device, wherein the recipient device utilizes the transaction-related information to complete a payment transaction and provide one or more value added services associated with the payment transaction.

In one aspect of an embodiment, the value added services data can include at least one of (i) data associated with one or more value added services to be performed before completion of the payment transaction or (ii) data associated with one or more value added services to be performed following completion of the payment transaction.

In one aspect of an embodiment, the card emulation communication is initiated by the recipient device in association with a card emulation protocol.

In one aspect of an embodiment, the card emulation protocol can include one of an International Standards Organization 14443 protocol or an International Standards Organization 18092 emulation protocol.

In one aspect of an embodiment, the value added services data can include a plurality of nested tags and associated values.

In one aspect of an embodiment, the value added services can include at least one of: electronic wallet services, loyalty services, coupon redemption services, location-based mobile services, electronic receipt services, product registration services, product warranty services, coupon and/or offer issuance services, targeted advertisement services, or receipt reconciliation with issuer statement services.

In one aspect of an embodiment, the recipient device can include at least one of the following: a merchant POS terminal, a merchant register, a merchant computer, a mobile device, a laptop computer, a tablet computer, a mobile phone, or a smart phone.

Additional systems, methods, apparatus, features, and aspects are realized through the techniques of various embodiments of the disclosure. Other embodiments and aspects of the disclosure are described in detail herein and are considered a part of the claimed disclosure. Other features and aspects can be understood with reference to the description and to the drawings.

DETAILED DESCRIPTION

Various embodiments of the disclosure are directed to systems and methods for facilitating communication of transaction-related information, such as payment information and/or value added services ("VAS") information, from a consumer device (e.g., a mobile device, a contactless payment device, etc.) to a recipient device (e.g., a merchant point of sale ("POS") device, another reader device, etc.) via card emulation functionality. In various embodiments, a portion of communicated information may relate to traditional card emulation data, such as Track 1 and Track 2 data similar to that stored by conventional magnetic cards. Additionally, another portion of the communicated information may relate to additional transaction-related data, such as VAS information. As desired, a wide variety of suitable methods and/or techniques may be utilized to communicate information via a card emulation mode. For example, a card emulation mode in accordance with ISO standard 14443 or ISO standard 18092 may be utilized.

A wide variety of suitable methods and/or techniques may be utilized to format and store information on consumer device that can be communicated to a recipient device utilizing a card emulation mode and/or a card emulation protocol. In certain embodiments, a Basic Encoding Rules-Tag Length Value ("BER-TLV") data encoding structure, such as the structure defined by ISO 7816-4, may be utilized to format information to be communicated. As desired, the data may include at least one tag, a length that defines a size of a data payload, and a value structure that includes a data payload. As desired, tags may be nested within a data structure. For example, a data payload (e.g., the value structure) may include additional tags that are associated with their own lengths and values (e.g., nested payloads). In various embodiments, a nested tag structure may be utilized to format and store VAS information and/or other information (e.g., non-payment account information, etc.) to be provided to a reader during a card emulation communication.

Embodiments of the disclosure now will be described more fully hereinafter with reference to the accompanying drawings, in which certain embodiments are shown. This invention may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

Figure 1:
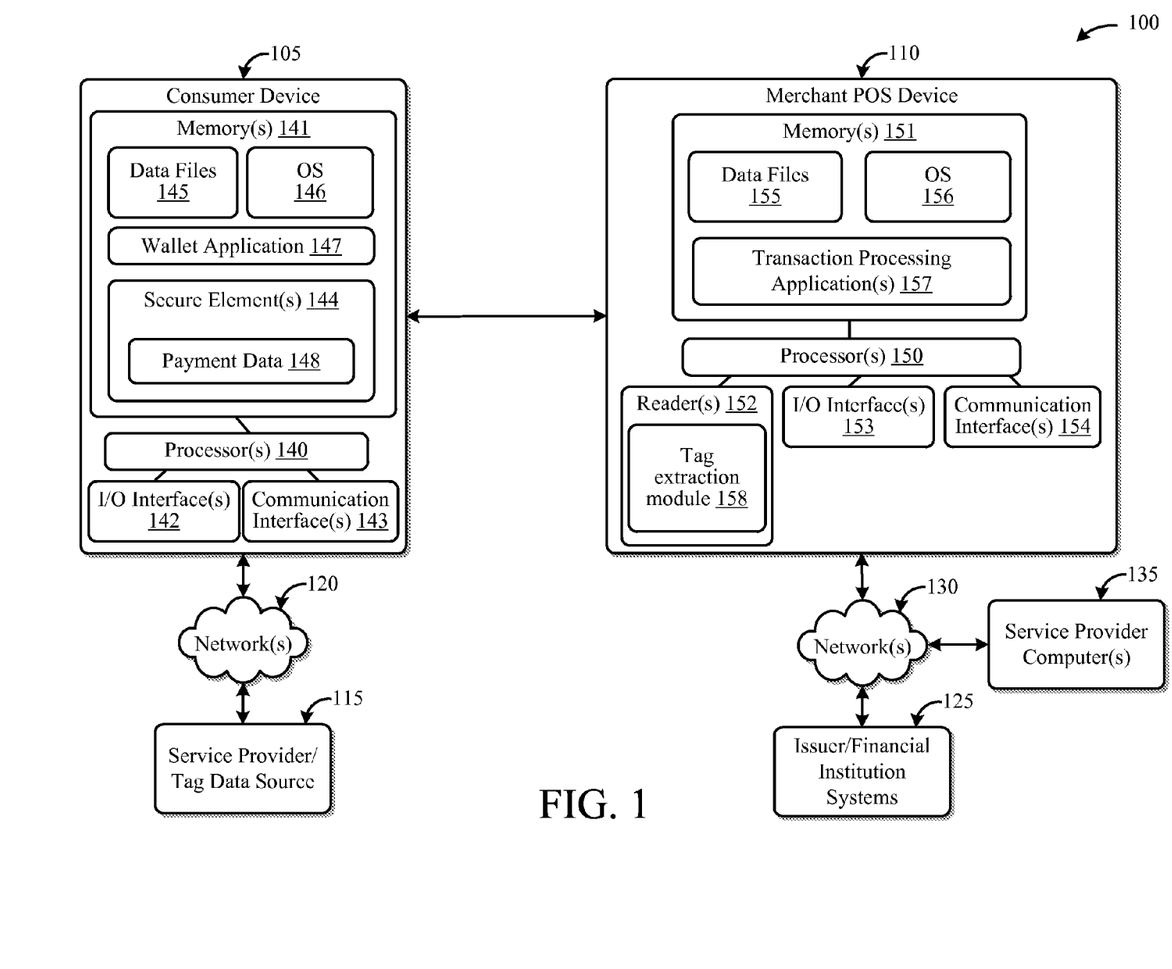
FIG. 1 illustrates a block diagram of an example system that may be utilized in accordance with various embodiments of the disclosure to facilitate communication of transaction-related information via a card emulation mode.

FIG. 1 represents a block diagram of an example system 100 that may be utilized in accordance with various embodiments of the disclosure to facilitate communication of transaction-related information from a consumer device (also referred to as a payment device) to a recipient device via a card emulation mode. In certain embodiments, the system 100 may utilize a suitable ISO protocol to facilitate NFC communications via a card emulation mode, such as the ISO 14443 protocol or the card emulation portion of the ISO 18092 protocol. As shown in FIG. 1, the system 100 may include a consumer device 105 and one or more merchant POS devices 110 (e.g., merchant POS terminals, merchant registers, merchant computers, etc.). Although a merchant POS device 110 is illustrated as a recipient device, other types of recipient devices may be utilized, such as a mobile device or a payee, a laptop computer, a tablet computer, a mobile phone, a smart phone, etc. As desired, the system 100 may additionally include a wide variety of other entities associated with payment transactions, such as one or more service providers/tag data sources 115 in communication with the consumer device 105 via one or more first networks 120 (e.g., a cellular network, the Internet, etc.) and/or one or more issuer/financial institution systems 125 in communication with the merchant POS device 110 (and optionally the consumer device 105) via one or more second networks 130 (e.g., a transaction network, etc.), which may be the same or different than the first networks 120. As shown, one or more service provider computers 135 (e.g., service provider computers that perform VAS functionality, etc.), which may be the same or different than the service provider/tag data sources 115, may also be in communication with the merchant POS device 110 (and optionally the consumer device) via the second networks 130.

With reference to FIG. 1, any number of consumer devices 105 may be provided. Examples of suitable consumer devices 105 include, but are not limited to, mobile devices (e.g., mobile phones, smart phones, laptop computers, tablet computers, etc.) and/or other contactless transaction devices that support card emulation functionality. For example, a consumer device 105 may include an NFC chip or other NFC component that facilitates the communication of transaction-related data to the merchant POS device 110 (or other recipient device) in accordance with ISO 14443, ISO 18092, or in accordance with another card emulation protocol (e.g., a proprietary protocol, etc.). In other embodiments, the consumer device 105 may utilize a card emulation protocol associated with other types of contactless communications functionality, such as RF functionality, to communicate transaction-related information.

As desired, a consumer device 105 may include any number of processor-driven devices, including but not limited to, a mobile computer, an application-specific circuit, a minicomputer, a microcontroller, and/or any other processor-based device. A consumer device 105 may utilize one or more processors 140 to execute computer-readable instructions that facilitate the general operation of the consumer device 105 (e.g., call functionality, etc.) and/or the completion of a payment transaction. As a result of executing these computer-readable instructions, a special purpose computer or particular machine may be formed that facilitates the communication of transaction-related information (e.g., payment credentials, VAS information, etc.) to a recipient device via a card emulation mode and/or protocol.

In addition to having one or more processors 140, the consumer device 105 may further include and/or be associated with one or more memory devices 141 (generally referred to as memory 141), input/output ("I/O") interface(s) 142, and/or communication and/or network interface(s) 143. The memory 141 may be any computer-readable medium, coupled to the processor(s) 140, such as random access memory ("RAM"), read-only memory ("ROM"), and/or removable storage devices. The memory 141 may store a wide variety of data files 145 and/or various program modules, such as an operating system ("OS") 146 and/or one or more wallet applications 147. In certain embodiments, a consumer device 105 may include one or more secure elements 144 configured to securely store and/or access information, such as payment applications, payment account information, and/or other transaction-related information. For example, one or more secure elements 144 may be configured to store payment data 148 or payment information, such as transaction-related data (e.g., payment account data, VAS data, etc.) to be communicated to a reader during a card emulation mode. The secure elements 144 may be stored in the memory 141 and/or included as a separate component of the consumer device 105. For example, a secure element 144 may be a separate chip that is configured to communicate with primary computing functionality for the consumer device 105, such as a primary chip that includes NFC communications functionality. As desired, one or more transaction applications may be stored on a secure element 144. For example, a transaction application may be stored in association with each payment account (and/or account issuer) utilized by the consumer device 105. The transaction applications may be invoked by other components of the consumer device 105, such as the wallet application 147.

The data files 145 may include any suitable data that facilitates the operation of the consumer device 105 and/or interaction of the consumer device 105 with one or more other components of the system 100. For example, the data files 145 may include information associated with accessing the secure elements 144, information associated with communicating with and/or invoking a tokenization service provider 115, information associated with invoking a wallet application 147, information associated with outputting transaction-related information via a card emulation mode, etc. The OS 146 may be a suitable module that facilitates the general operation of the consumer device 105, as well as the execution of other program modules. For example, the OS 146 may be, but is not limited to, a suitable mobile OS or a specially designed operating system. As desired, the consumer device 105 may additionally include one or more communication modules that facilitate interaction with other devices, such as merchant POS devices equipped with contactless readers and/or other communications functionality. For example, a suitable near field communication module may be included in the consumer device 105.

According to an aspect of the disclosure, the stored payment data 148 (or the data files 145) may include a wide variety of transaction-related data to be communicated to a reader during a card emulation communication. Additionally, as desired, respective payment data 148 may be stored for each of a plurality of payment accounts, such as credit accounts, debit accounts, and/or stored value accounts. A wide variety of different types of payment data 148 may be stored as desired including payment credential data and/or a wide variety of data to be communicated during a card emulation mode, such as payment account data (e.g., Track 1 and Track 2 data, etc.), an unpredictable number that may be utilized in association with a transaction, VAS information, and/or any additional information. Additionally, a wide variety of suitable methods and/or techniques may be utilized to format and store information on a consumer device that can be communicated to a recipient device utilizing a card emulation mode and/or a card emulation protocol. In certain embodiments, a BER-TLV data encoding structure, such as the structure defined by ISO 7816-4, may be utilized to format information to be communicated. As desired, the data may include at least one tag, a length that defines a size of a data payload, and a value structure that includes a data payload. As desired, tags may be nested within a data structure. For example, a data payload (e.g., the value structure) may include additional tags that are associated with their own lengths and values (e.g., nested payloads). In various embodiments, a nested tag structure may be utilized to format and store VAS information and/or other information (e.g., non-payment account information, etc.) to be provided to a reader during a card emulation communication.

One example set of tags that may be utilized in embodiments of the disclosure may include a tag for Track 1 data, a Tag for Track 2 data, a Tag for an unpredictable number, and one or more tags for extensible VAS data. Additionally, any number of nested tags may be utilized. For example, a set of tags may include:

| Tag | Content |
| --- | --- |
| Tag = 56 | Content = Track 1 data |
| Tag = 57 | Content = Track 2 data |
| Tag = E2 | Content = Unpredictable Number |
| Tag = E3 | Content = Extensible VAS data |

Nested within Tag "E3" may be any number of tags directed to various VAS. For example, the payload or content of Tag "E3" may include:

| Tag = E3 Content | |
| --- | --- |
| Nested Tag | Content |
| A first Tag "E4" may include extensible information associated with Before Payment VAS | |
| Tag = E4 | Content = Extensible Before Payment VAS |
| Nested within Tag "E4" may be any number of tags such as: | |
| Tag = F1 | Content = Before Payment VAS Service ID (1) |
| Tag = F2 | Content = Data for Before Payment VAS identified by F1 |
| Tag = Fn | Content = Before Payment VAS ID (N) |
| Tag = Fn + 1 | Content = Data for Before Payment VAS identified by Fn |
| Another Tag "E5" may include information associated with After Payment VAS | |
| Tag = E5 | Content = Extensible After Payment VAS |
| Nested within Tag "E5" may be any number of Tags such as: | |
| Tag = G1 | Content = After Payment VAS Service ID (1) |
| Tag = G2 | Content = Data for After Payment VAS identified by G1 |
| Tag = Gn | Content = Before Payment VAS ID (N) |
| Tag = Gn + 1 | Content = Data for Before Payment VAS identified by Gn |

Indeed, a wide variety of nested tags may be included in the E3 payload in order to identify and/or provide information (e.g., preferences, parameters, etc.) associated with the execution of any number of VAS. Additionally, the data included in the various tags may be extensible as additional VAS become available. In certain embodiments, the size of a message may provide an overall limit on the amount of data that may be included in a communication (e.g., a communication that includes the Track 1, Track 2, unpredictable number, and Extensible VAS or E3 data). In such a situation, a tag (or data value) at the end of the message may indicate that additional information is available in a subsequent message. For example, with the ISO 14443 and 18092 standards, a total size of a message may be limited to approximately 255 bytes. However, if more than 255 bytes is available for communication in a card emulation mode, the end of a first message may indicate that a continuation message (or multiple continuation messages) will be communicated. In this regard, any number of messages may be communicated in order to provide a wide variety of data to a reader device. Additionally, although the "E3" data is described above as being associated with VAS information, other types of information may be included in one or more tags and/or data elements that are communicated during a card emulation mode.

Figure 2:
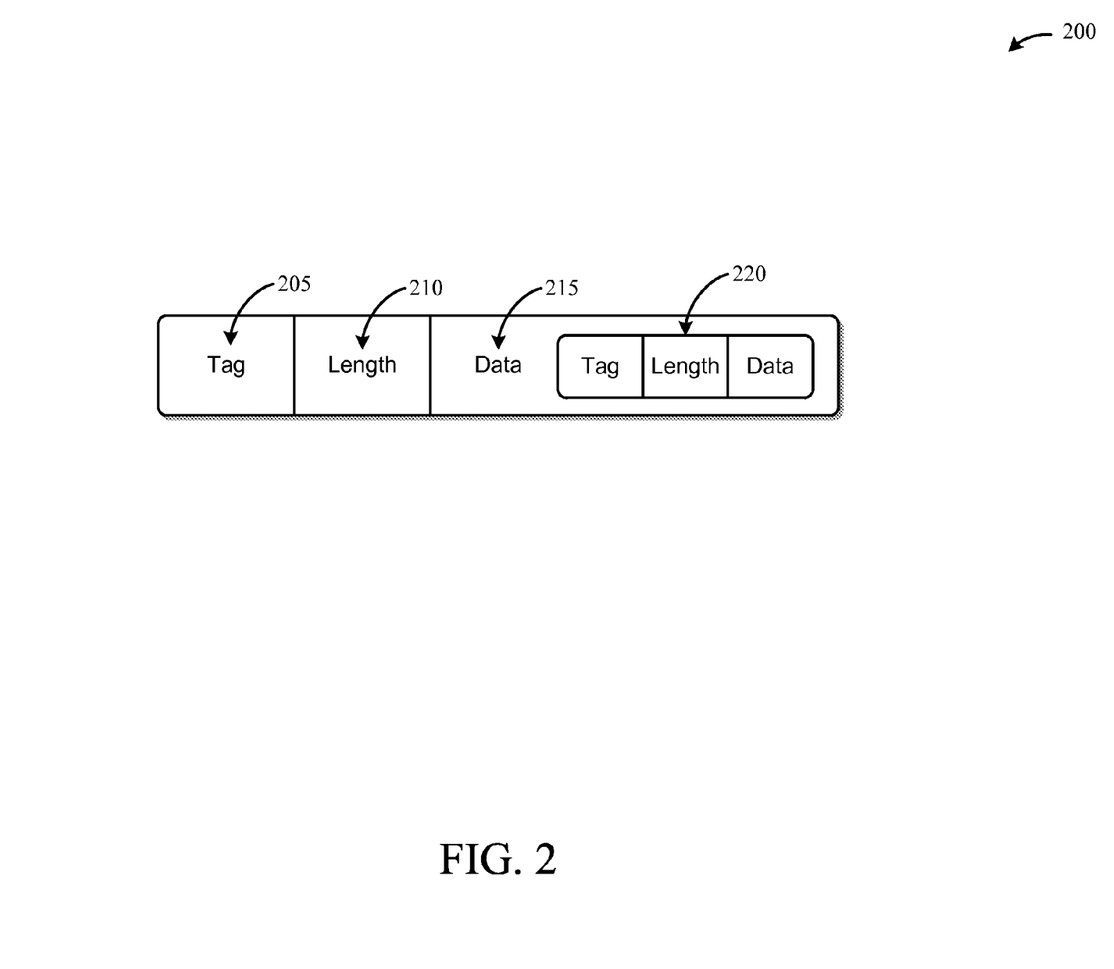
FIG. 2 illustrates a block diagram of an example data structure that may be utilized to communicate transaction-related data during a card emulation mode according to at least one embodiment of the disclosure.

FIG. 2 illustrates a block diagram of an example data structure 200 that may be utilized to communicate transaction-related data during a card emulation mode. The data structure 200 of FIG. 2 illustrates a nested tag concept. With reference to FIG. 2, the data structure 200 may include a tag 205, a length 210, and/or a data payload 215. The tag 205 may be, for example, the first byte of the data structure 200, and the tag 205 may define data included in the data structure 200. The length 210 may be, for example, the second byte of the data structure 200, and the length 210 may establish or specify an amount of data included in the data structure 200. The data payload 215 may be of a variable length, and the data payload 215 may include a wide variety of transaction-related data.

As shown in FIG. 2, the data payload 205 may include any number of additional tag-length-data (or tag-length-value) constructs 220 that include and/or specify different types of transaction-related data. In this regard, a nested structure may be formed. Additionally, as desired, the information or data included in the nested structure may be extensible.

With continued reference to the consumer device 105, the wallet application 147 may include one or more suitable software modules and/or applications configured to collect transaction-related information and/or to direct communication of transaction-related information to a recipient device. For example, the wallet application 147 may be configured to facilitate the collection of payment credentials and/or payment data 148 from a secure element 144 (or other memory element) for delivery to a recipient device via a card emulation mode. As desired in certain embodiments, the wallet application 147 may invoke one or more transaction applications stored on the secure element 144 in order to obtain information to be communicated to a recipient device by a suitable NFC component of the consumer device 105.

According to an example embodiment, the wallet application 147 may be invoked in association with a proposed payment transaction. For example, a user of the consumer device 105 may invoke the wallet application 147 in order to request completion of a transaction. Once invoked, the wallet application 147 may obtain transaction-related information to be communicated to a recipient device, and the wallet application 147 may provide the transaction-related information to a suitable NFC component (or other communications component). The recipient device may then initiate a card emulation transaction when the consumer device 105 is within range of the recipient device, and the transaction-related information may be read from the NFC component. The recipient device may then utilize at least a portion of the information during the completion of a payment transaction. A few examples of the operations that may be performed by the wallet application 147 and/or the consumer device 105 are described in greater detail below with reference to FIG. 3.

Although the wallet application 147 is described as obtaining transaction-related information from the secure element 144, in certain embodiments, the wallet application 147 may additionally or alternatively obtain transaction-related information from one or more external service providers or data sources 115. In certain embodiments, transaction-related information may be obtained in association with a desired transaction. In other embodiments, transaction-related information may be obtained and stored in the secure element 144 for use with future transactions. In yet other embodiments, a service provider 115 may drive transaction-related information to a secure element via any number of suitable processes, such as an over the air provisioning process.

With continued reference to the consumer device 105, the one or more I/O interfaces 142 may facilitate communication between the consumer device 105 and one or more input/output devices; for example, one or more user interface devices, such as a display, a keypad, a touch screen display, a microphone, a speaker, etc., that facilitate user interaction with the consumer device 105. The one or more network and/or communication interfaces 143 may facilitate connection of the consumer device 105 to one or more suitable networks, for example, the network(s) 120 illustrated in FIG. 1. In this regard, the consumer device 105 may receive and/or communicate information to other components of the system 100. For example, the consumer device 105 may communicate with one or more service providers 115 in order to obtain transaction-related information.

With continued reference to FIG. 1, any number of merchant POS devices 110 may be provided. A merchant POS device 110 may be a suitable device that facilitates the completion of payment transactions. In operation, the merchant POS device 110 may utilize one or more processors 150 to execute computer-readable instructions that facilitate the collection of transaction-related information (e.g., payment account information, VAS information, information associated with items to be purchased, transaction amounts, etc.) and/or the generation and/or output of transaction-related requests (e.g., transaction authorization requests, value added service ("VAS") requests, etc.). As a result of executing these computer-readable instructions, a special purpose computer or particular machine may be formed that facilitates the completion of POS payment transactions.

In addition to having one or more processors 150, the merchant POS device 110 may further include and/or be associated with one or more memory devices 151 (generally referred to as memory 151), readers 152 or reader devices, input/output ("I/O") interface(s) 153, and/or network interface(s) 154. The memory 151 may be any computer-readable medium, coupled to the processor(s) 150, such as random access memory ("RAM"), read-only memory ("ROM"), and/or a removable storage device. The memory 151 may store a wide variety of data files 155 and/or various program modules, such as an operating system ("OS") 156 and/or one or more transaction processing applications or modules 157. The data files 155 may include any suitable data that facilitates the operation of the merchant POS device 110 and/or interaction of the merchant POS device 110 with one or more other components (e.g., one or more issuer systems 125, one or more service provider computers 135, etc.) of the system 100. For example, the data files 155 may include information associated with the readers 152, information that facilitates the processing of received transaction-related information, acquiring platform information, service provider information, information associated with the generation of proposed transaction and/or VAS requests, information associated with available VAS, and/or routing information for proposed transactions.

The OS 156 may be a suitable module that facilitates the general operation of the merchant POS device 110, as well as the execution of other program modules. For example, the OS 156 may be, but is not limited to, Microsoft Windows®, Apple OSX™, Unix, a mainframe computer operating system (e.g., IBM z/OS, MVS, OS/390, etc.), or a specially designed operating system. The transaction processing applications or modules 157 may include any number of suitable software modules and/or applications that facilitate the receipt of transaction information (e.g., information received via a card emulation mode, a purchase amount, information associated with purchased products, etc.), the generation of a proposed transaction, and/or the output of the proposed transaction. In certain embodiments, the transaction processing applications 157 may additionally facilitate the identification of information associated with a wide variety of value added services and the generation of one or more requests to invoke value added services, such as requests communicated to one or more service provider computers 135.

In certain embodiments, the transaction processing application 157 may be configured to receive information from the one or more readers 152 and process the received information in association with a payment transaction. For example, the transaction processing application 157 may receive transaction-related information collected from a consumer device 105 via a card emulation mode. The received information may include, for example, Track 1 data, Track 2 data, an unpredictable number, a wide variety of information associated with VAS, and/or other information. The transaction processing application 157 may then process the received information in order to complete a payment transaction and/or to facilitate any number of VAS associated with the payment transaction.

In certain embodiments, the transaction processing application 157 may utilize at least a portion of the transaction-related information to provide any number of transaction-related VAS services. For example, the transaction processing application 157 may invoke and/or request (e.g., request a service provider computer, etc.) the invocation of a wide variety of before payment VAS associated with a transaction, such as the application of coupons, the award and/or redemption of loyalty rewards, etc. The transaction processing application 157 may also generate a proposed transaction request that is output for routing and/or delivery to a suitable transaction processor, such as a payment account issuer system 125. In the event that the transaction is authorized, the transaction processing application 157 may invoke and/or request the invocation of a wide variety of after payment VAS following the transaction, such as receipt generation and/or delivery services, product registration services, etc. Indeed, a wide variety of suitable operations may be performed by the transaction processing application 157. A few examples of the operations that may be performed by a transaction processing application 157 and/or the merchant POS device 110 are described in greater detail below with reference to FIG. 3.

With continued reference to the merchant POS device 110, any number of suitable reader devices 152 may be provided. For example, an NFC contactless reader may be utilized, and the NFC reader may facilitate a card emulation mode of operation. During operation, a reader 152 may function as an active device that transmits a read signal to a consumer device 105 and/or associated read component. In this regard, the reader 152 may read transaction-related data from the consumer device 105 in a card emulation mode. In certain embodiments, the reader 152 may additionally include one or more tag extraction modules 158 that process the received signal in order to identify or determine data included in the signal. For example, a tag extraction module 158 may evaluate a signal in order to extract tags and/or associated payload data. The one or more I/O interfaces 153 may facilitate communication between the merchant POS device 110 and one or more input/output devices; for example, one or more user interface devices, such as a display, a keypad, a mouse, a pointing device, a control panel, a touch screen display, a remote control, a microphone, a speaker, the reader devices 152, etc., that facilitate user interaction with the merchant POS device 110. The one or more network and/or communication interfaces 154 may facilitate connection of the merchant POS device 110 to one or more suitable networks and/or communication links. In this regard, the merchant POS device 110 may receive and/or communicate information to other components of the system 100, such as the issuer systems 125, the service provider computers 135, and/or other devices and/or systems.

With continued reference to FIG. 1, any number of service providers and/or tag data sources 115 may be included in the system 100. A tag data source 115 may facilitate the provision of transaction-related information (e.g., tag information, payload data, etc.) to a consumer device 105 for storage on a secure element 144 and/or for use during any number of payment transactions. For example, in certain embodiments, a tag data source 115 may drive transaction-related information to a consumer device 105 for one or more payment accounts utilizing an over the air provisioning process or any other suitable process. In other embodiments, a tag data source may provide transaction-related information to a consumer device 105 in response to a request for the data, such as a request associated with a proposed transaction. In certain embodiments, a tag data source 115 may include similar components as those discussed above for the merchant POS device 110. For example, a tag data source 115 may include any number of processors, memories, I/O interfaces, and/or network/communication interfaces.

Additionally, any number of issuer and/or financial institution systems 125 may be provided. An issuer system 125 may facilitate the backend processing of a proposed transaction. For example, an issuer system 125 may facilitate the approval and/or settlement of a proposed transaction. In certain embodiments, a proposed transaction may be routed to an issuer system 125 via a suitable transaction network (e.g., a debit network, a credit network, etc.), and the issuer system 125 may evaluate the proposed transaction. An approval or rejection of the proposed transaction may then be output for communication to a merchant POS device 110. The issuer system 125 may then facilitate the settlement of the proposed transaction. In certain embodiments, an issuer system 125 may include similar components as those discussed above for the merchant POS device 110. For example, an issuer system 125 may include any number of processors, memories, I/O interfaces, and/or network/communication interfaces.

Additionally, any number of service provider computers 135 may be utilized as desired in various embodiments of the disclosure. A service provider computer may provide a wide variety of transaction-related and/or value added services ("VAS") in association with transactions, such as coupon redemption services, loyalty services, location-based services, electronic receipt services, product registration services, warranty services, coupon issuance services, and/or the routing of a proposed transaction to an issuer for approval and/or settlement purposes. In certain embodiments, a service provider computer 135 may include similar components as those discussed above for the merchant POS device 110. For example, a service provider computer 135 may include any number of processors, memories, I/O interfaces, and/or network/communication interfaces.

A wide variety of suitable networks and/or communication channels 120, 130 may be utilized in association with embodiments of the disclosure. Certain networks may facilitate communication between remote devices. For example, one or more telecommunication networks, cellular networks, wide area networks (e.g., the Internet) and/or transaction networks (e.g., branded networks (e.g., a VISA network, etc.), debit and/or PIN networks, and/or a wide variety of other suitable transaction networks) may facilitate communication between various components of the system 100. Other networks and connections, such as NFC connections, may facilitate communication between the consumer device 105 and the merchant POS device 110. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Operational Overview

Figure 3:
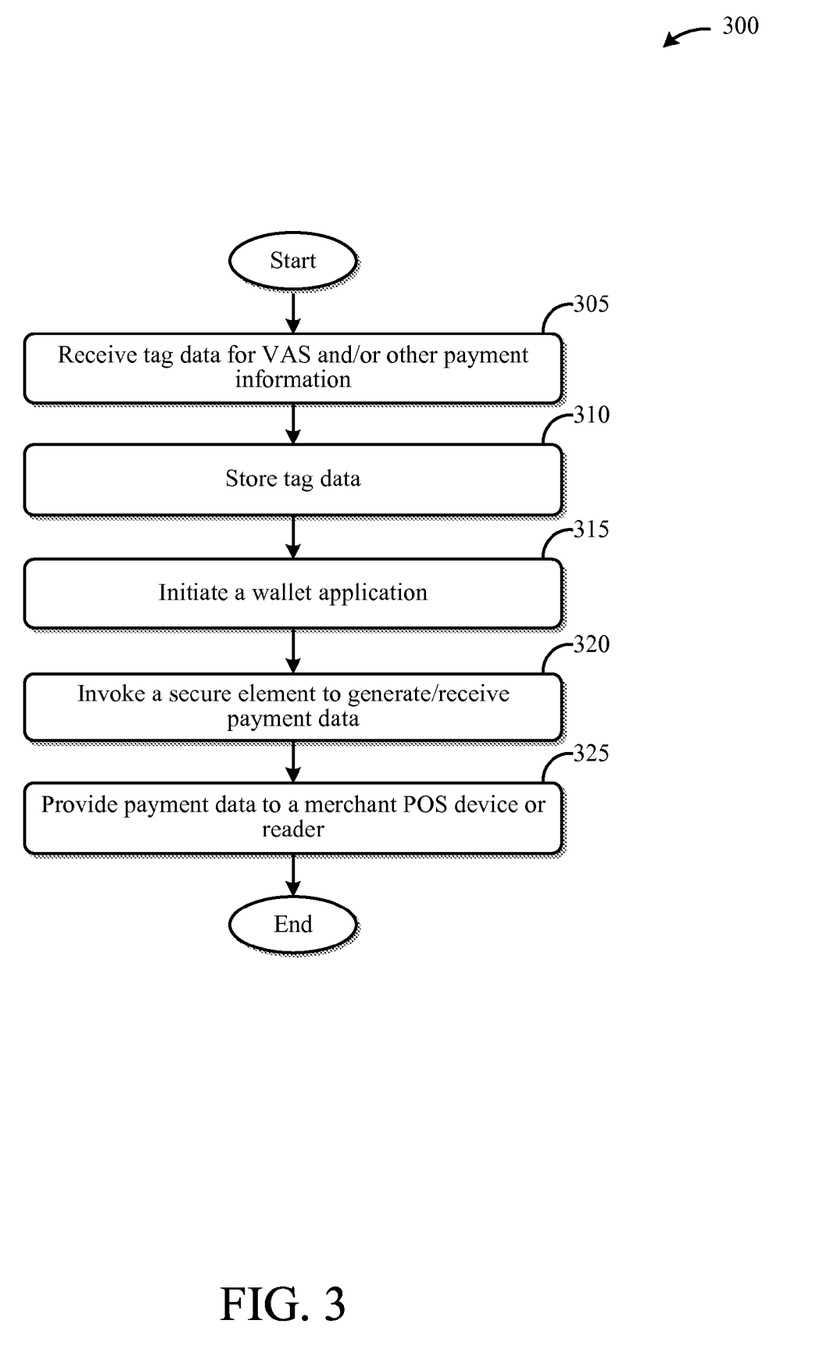
FIGS. 3 and 4 illustrate flow diagrams of example processes for communicating transaction-related information via a card emulation mode, in accordance with illustrative embodiments of the disclosure.

FIG. 3 illustrates a flow diagram of an example process 300 for communicating transaction-related information from a consumer device to a merchant POS device or other recipient device, according to an example embodiment of the disclosure. In certain embodiments, the operations of the method 300 may be performed by a suitable consumer device, such as the consumer device 105 illustrated in FIG. 1. The method 300 may begin at block 305.

At block 305, tag data may be received by the consumer device 105. A wide variety of different methods and/or techniques may be utilized to receive tag data as desired in various embodiments. For example, service providers, payment account issuers, and/or other data sources may communicate or otherwise direct tag data to a consumer device 105 for storage by the consumer device 105, such as storage on a secure element. In certain embodiments, tag data may be driven to a consumer device 105 via an over the air provisioning process. In other embodiments, tag data may be communicated via other network communications. In yet other embodiments, tag data may be pre-loaded on a secure element. A wide variety of different types of tag data may be received as desired, such as payment account data (e.g., payment credentials, account identifiers, representative values of account identifiers, etc.), information associated with VAS, and/or other information. As desired, tag data associated with a particular payment account may be received from a single source and/or from multiple sources. For example, a payment account issuer may provide payment account data, and a service provider may provide VAS data. In certain embodiments, once tag data has been received by the consumer device 105, the tag data may be stored at block 310. For example, tag data may be stored in one or more secure elements associated with the consumer device 105.

At block 315, a wallet application (or other suitable transaction facilitating application), such as the wallet application 147 illustrated in FIG. 1, may be invoked on the consumer device 105. For example, the wallet application 147 may be invoked by a consumer (e.g., a user of the consumer device 105, etc.) or by another device (e.g., a merchant POS device 110 that initiates a card emulation communication, etc.). At block 320, the wallet application 147 may invoke and/or access a secure element (or other source of tag data) in order to generate and/or receive transaction-related information. The transaction-related information may then be provided to a merchant POS device or other reader-enabled device at block 325 in association with a payment transaction. For example, at least a portion of the information obtained from the secure element may be provided to an NFC component (or other suitable communications component) of the consumer device 105, and the information may be read from the NFC component during a card emulation mode communication.

Once the data is communicated to the merchant POS device 110 (or other recipient device), a payment transaction may be completed. In certain embodiments, the merchant POS device 110 may facilitate completion of the payment transaction. In other embodiments, the merchant POS device 110 and/or any number of other systems (e.g., an issuer system, a service provider system, etc.) may communicate with the consumer device 105 during the completion of a payment transaction. The method 300 may end following block 325.

As mentioned above, a wide variety of different types of information may be communicated by the consumer device 105 to the merchant POS device 110 via a card emulation mode. This information may include payment-related data and/or a wide variety of VAS data, as well as representative values and/or links to the various data. Payment-related data may include, for example, identification information for a payment account to be utilized in association with a transaction (e.g., an account number, an identifier of an account issuer, etc.), consumer identification information that may be utilized to identify or select a payment account, and/or consumer device identification information (e.g., device identifier, a mobile telephone number, etc.) that may be utilized to identify or select a payment account. VAS data may include information associated with the provision of a wide variety of VAS in association with the transaction. These VAS may be implemented by the merchant POS device 110 and/or by any number of suitable service provider computers directly or indirectly in communication with the merchant POS device 110. A wide variety of different types of VAS may be implemented as desired in various embodiments, and each of the VAS may be associated with information received from the consumer device 105 and/or accessed from a suitable data source on behalf of the consumer. Examples of suitable pre-transaction VAS include, but are not limited to, electronic wallet services, loyalty services, coupon redemption services, location-based mobile services. Examples of suitable post-transaction VAS include, but are not limited to, electronic receipt services, product registration services, product warranty services, coupon and/or offer issuance services, targeted advertisement services, receipt reconciliation with issuer statement services, etc. Various VAS may be invoked prior to the completion of a transaction, during the completion of the transaction, and/or following the completion of the transaction.

An example electronic wallet service, which may alternatively be implemented as a transaction processing service, may facilitate the identification of a payment account to utilize in association with a transaction, as well as the verification of a consumer's identity. A loyalty service may identify an applicable loyalty account of the consumer, such as a loyalty account with the merchant. The loyalty service may then facilitate the issuance and/or redemption of loyalty points and/or loyalty rewards in association with the transaction. A coupon redemption service may compare products being purchased (e.g., UPCs, etc.) with available coupons (e.g., coupons identified from received transaction information, coupons stored at the service provider in association with the consumer, coupons accessed from an external data source, etc.), and the coupon redemption service may identify coupons that may be redeemed. The coupon redemption service may then facilitate the communication of applied coupons to coupon issuers, and the distribution of redeemed coupon revenue to the merchant. A location-based mobile service may perform a wide variety of suitable services based upon received location information (e.g., GPS coordinates, etc.) for a consumer device. For example, a location-based mobile service may evaluate a consumer device location based upon consumer transaction processing preferences, and the location-based service may determine whether the transaction may be completed based at least in part upon the evaluation. For example, a consumer may specify that a consumer device (e.g., a mobile device of a child) can only be used at gas stations and/or grocery stores in order to complete transactions. A location-based service may utilize GPS coordinates for the consumer device to identify a merchant for a proposed transaction, and the location-based service may determine whether a transaction can be approved for the merchant. As another example of a location-based service, a consumer may request different VA services in different states and/or geographical regions. Indeed, a wide variety of different location-based services may be provided as desired.

An example electronic receipt service may generate electronic receipts for a transaction, and the electronic receipts may be delivered to any number of recipients, such as the merchant POS device 110 and/or the consumer device 105. An example product registration service may automatic complete a product registration application on behalf of the consumer and deliver the registration application to a suitable recipient, such as a manufacturer. As desired, a consumer may specify the types of products (e.g., electronics, appliances, etc.) for which product registration services will be provided. An example product warranty service may identify and store product warranty information on behalf of the consumer. Another example product warranty service may evaluate consumer preferences in order to automatically (or upon prompting) purchase an extended warranty for a purchased product. An example coupon issuance service may identify, based upon, for example, the purchased products and/or historical purchases, one or more coupons to be issued to the consumer (e.g., coupons that may be printed on the back of or otherwise associated with a receipt). Similarly, a targeted advertisement service may identify advertisements and/or promotions to be communicated to the consumer. An example receipt reconciliation service may compare a purchase amount to a subsequently obtained issuer statement (e.g., a credit card statement, a bank statement, etc.) and identify any discrepancies. In other words, an example reconciliation service may conduct an audit of the transaction on behalf of the consumer and/or the merchant.

Figure 4:
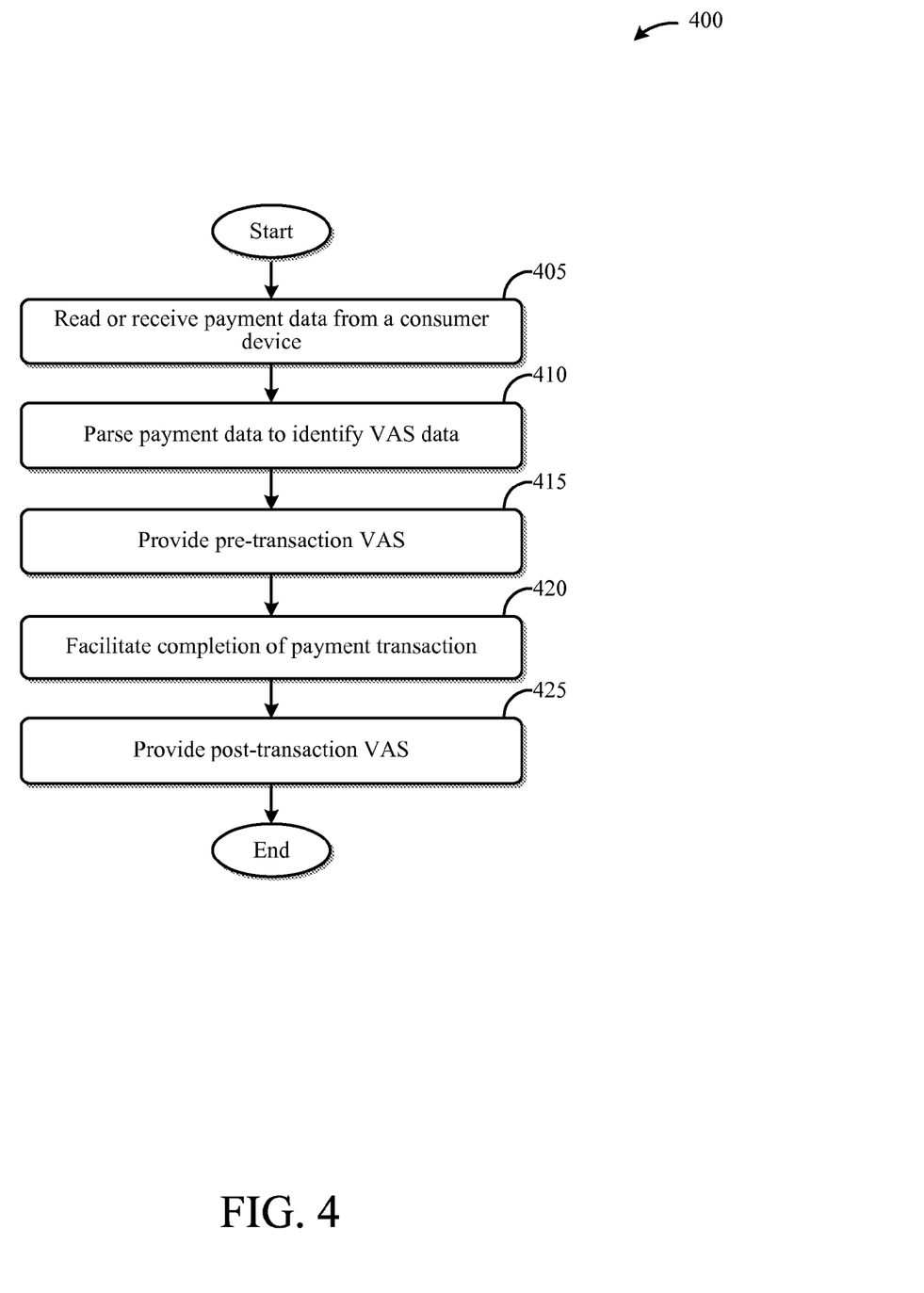

FIG. 4 illustrates a flow diagram of an example process 400 for reading information from a consumer device via a card emulation mode and completing a payment transaction based at least in part upon the received information. In certain embodiments, the operations of the method 400 may be performed by a suitable merchant POS device and/or associated transaction processing application, such as the merchant POS device 110 and/or the transaction processing application 157 illustrated in FIG. 1. The method 400 may begin at block 405.

At block 405, transaction-related or payment data may be read or received (e.g., received from a suitable reader) from a consumer device 105. For example, a reader device may initiate a card emulation mode communications session, and transaction-related information may be read from a consumer device 105. In certain embodiments, a peer to peer connection may be established in accordance with the ISO 18092 standard. As described in greater detail above, a wide variety of payment and/or other transaction-related information, such as VAS information, may be received. Once information is received, the information may be parsed and/or otherwise processed at block 410 in order to identify relevant transaction-related data. In certain embodiments, payment data, VAS data, and/or other types of data may be identified based upon a wide variety of tags included in the received data.

At block 415, the merchant POS device 110 may utilize identified before payment VAS information to provide and/or facilitate a wide variety of pre-transaction VAS. In certain embodiments, any number of VAS requests may be communicated to one or more suitable service provider systems to facilitate pre-payment or pre-transaction VAS. At block 420, the merchant POS device 110 may facilitate completion of a payment transaction by communicating a transaction approval request and associated transaction-related information (e.g., payment account information, a payment amount, etc.) to an issuer system or other financial transaction processing system (e.g., an acquirer platform, a service provider, etc.). In certain embodiments, an approval for the payment transaction may be received in response to an approval request and, as desired, the transaction may be completed and/or settled. Additionally, at block 425, the merchant POS device 110 may utilize identified after payment VAS information to provide and/or request the provision of a wide variety of suitable post-transaction VAS. For example, the merchant POS device 110 may communicate any number of VAS requests to one or more suitable service provider systems. The method 400 may end following block 425.

The operations described and shown in the methods 300, 400, of FIGS. 3-4 may be carried out or performed in any suitable order as desired in various embodiments of the disclosure. Additionally, in certain embodiments, at least a portion of the operations may be carried out in parallel. Furthermore, in certain embodiments, less than or more than the operations described in FIGS. 3-4 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. One or more non-transitory computer-readable media configured to store computer-executable instructions that, when executed by one or more processors, configure the one or more processors to:
   direct a secure element of a consumer device to store transaction-related information comprising payment data and value added services data, the value added services data formatted according to a nested tag structure comprising:
      a first tag, a first length indicative of a first size of first data payload, and a first value structure comprising the first data payload, the first value structure comprising a second tag, a second length indicative of a second size indicative of second data payload, and a second value structure comprising the second data payload;

communicate a first portion of the transaction-related information from the secure element to a communications component of the consumer device;

initiate, using the first portion of the transaction-related information, peer-to-peer communication with a recipient device over a wireless communication channel via the communications component, wherein to initiate the peer-to-peer communication, the one or more processors being further configured to receive, from a recipient device, a wireless read signal according to a protocol for wireless peer-to-peer communication during a card emulation communication initiated by the recipient device; and to activate, using the wireless read signal, the communication component to communicate wirelessly with the consumer device according to the protocol for wireless peer-to-peer communication;

direct the communications component to communicate, over the wireless communication channel, a second portion of the transaction-related information from the secure element to the recipient device during the card emulation communication initiated by the recipient device, wherein the second portion of the transaction-related information causes the recipient device to initiate implementation of a first value added service prior to completion of a payment transaction and further causes the recipient device to complete the payment transaction based on an outcome of the implementation of the first value added service; and direct the communication component to communicate a third portion of the transaction-related information over the wireless communication channel to the recipient device, the third portion of the transaction-related information comprising identifying information formatted according to the nested tag structure, wherein the identifying information comprises at least one of identification information for a payment account, consumer identification information, or consumer device identification information.

2. The one or more non-transitory computer-readable media of claim 1, wherein the value added services data comprises first data associated with the first value added service to be performed before completion of the payment transaction.

3. The one or more non-transitory computer-readable media of claim 1, wherein the card emulation communication is initiated by the recipient device in association with a card emulation protocol.

4. The one or more non-transitory computer-readable media of claim 3, wherein the card emulation protocol comprises one of an International Standards Organization 14443 protocol or an International Standards Organization 18092 emulation protocol.

5. The one or more non-transitory computer-readable media of claim 1, wherein the value added services comprise at least one of: electronic wallet services, loyalty services, coupon redemption services, location-based mobile services, electronic receipt services, product registration services, product warranty services, coupon issuance services, offer issuance services, targeted advertisement services, or receipt reconciliation with issuer statement services.

6. The one or more non-transitory computer-readable media of claim 1, wherein the recipient device comprises at least one of the following: a merchant point-of-sale (POS) terminal, a merchant register, a merchant computer, a mobile device, a laptop computer, a tablet computer, a mobile phone, or a smart phone.

7. The one or more non-transitory computer-readable media of claim 1, wherein the computer-executable instructions, when executed by one or more processors, further configure the one or more processors to direct the communications component to communicate, over the wireless communication channel, a fourth portion of the transaction-related information from the secure element to the recipient device during the card emulation communication initiated by the recipient device, wherein the fourth portion of the transaction-related information causes the recipient device to complete a payment transaction and further causes the recipient device to initiate implementation of a second value added service after completion of the payment transaction.

8. The one or more non-transitory computer-readable media of claim 1, wherein the computer-executable instructions, when executed by one or more processors, further configure the one or more processors to direct the communications component to communicate, over the wireless communication channel, a fourth portion of the transaction-related information from the secure element to the recipient device during the card emulation communication initiated by the recipient device, wherein the fourth portion of the transaction-related information causes the recipient device to complete a payment transaction and further causes the recipient device to initiate implementation of a second value added service during completion of the payment transaction.

9. A merchant point of sale device comprising:
at least one reader device configured to read transaction-related information from a payment device via a card emulation mode of operation; and
at least one processor configured to (i) receive transaction-related information, (ii) extract, from the received transaction-related information, payment data and value added services data associated with one or more value added services, (iii) process a payment transaction utilizing the payment data, (iv) cause to implement at least one value added service utilizing the value added services data prior to completion of the payment transaction, the payment transaction completed based on an outcome of the implementation of the at least one value added service, wherein the value added services data comprises information formatted according to a nested tag structure comprising a first tag, a first length indicative of a first size of first data payload, and a first value structure comprising the first data payload, the first value structure comprising a second tag, a second length indicative of a second size indicative of second data payload, and a second value structure comprising the second data payload, and (v) communicate a portion of the transaction-related information over a network to a transaction processing system, the portion of the transaction-related information comprising identifying information formatted according to the nested tag structure, wherein the identifying information comprises identification information for a payment account.

10. The merchant point of sale device of claim 9, wherein the card emulation mode of operation is facilitated via one of an International Standards Organization 14443 protocol or an International Standards Organization 18092 emulation protocol.

11. The merchant point of sale device of claim 9, wherein the one or more value added services comprise at least one of: electronic wallet services, loyalty services, coupon redemption services, location-based mobile services, electronic receipt services, product registration services, product warranty services, coupon issuance services, offer issuance services, targeted advertisement services, or receipt reconciliation with issuer statement services.

12. The merchant point of sale device of claim 9, wherein the payment device comprises at least one of the following: a mobile device, a mobile phone, a smart phone, a laptop computer, or a tablet computer.

13. A computer-implemented method comprising:
    directing a secure element of a consumer device to store transaction-related information comprising payment data and value added services data formatted according to a nested tag structure comprising:
        a first tag, a first length indicative of a first size of first data payload, and a first value structure comprising the first data payload, the first value structure comprising a second tag, a second length indicative of a second size indicative of second data payload, and a second value structure comprising the second data payload;
    communicating a first portion of the transaction-related information from the secure element to a communications component of the consumer device;
    initiating, using the first portion of the transaction-related information, peer-to-peer communication with a recipient device over a wireless communication channel via the communications component, the initiating including receiving, from a recipient device, a wireless read signal according to a protocol for wireless peer-to-peer communication during a card emulation communication initiated by the recipient device; and
        activating, using the wireless read signal, the communication component to communicate wirelessly with the consumer device according to the protocol for wireless peer-to-peer communication;
    communicating, over the wireless communication channel, via the communications component, a second portion of the transaction-related information from the secure element to the recipient device during a card emulation communication initiated by the recipient device, wherein the second portion of the transaction-related information causes the recipient device to initiate implementation of a first value added service prior to completion of a payment transaction and further causes the recipient device to complete the payment transaction based on an outcome of the implementation of the first value added service; and
    communicating a third portion of the transaction-related information over the wireless communication channel to the recipient device, the third portion of the transaction-related information comprising identifying information formatted according to the nested tag structure, wherein the identifying information comprises at least one of identification information for a payment account, consumer identification information, or consumer device identification information.

14. The computer-implemented method of claim 13, wherein the value added services data comprises first data associated with the first value added service to be performed before completion of the payment transaction.

15. The computer-implemented method of claim 13, wherein the card emulation communication is initiated by the recipient device in association with a card emulation protocol.

16. The computer-implemented method of claim 15, wherein the card emulation protocol comprises one of an International Standards Organization 14443 protocol or an International Standards Organization 18092 emulation protocol.

17. The computer-implemented method of claim 13, wherein the value added services comprise at least one of: electronic wallet services, loyalty services, coupon redemption services, location-based mobile services, electronic receipt services, product registration services, product warranty services, coupon issuance services, offer issuance services, targeted advertisement services, or receipt reconciliation with issuer statement services.

18. The computer-implemented method of claim 13, wherein the recipient device comprises at least one of the following: a merchant point-of-sale (POS) terminal, a merchant register, a merchant computer, a mobile device, a laptop computer, a tablet computer, a mobile phone, or a smart phone.

\* \* \* \* \*